United States Patent [19]
Athy, Jr.

[11] 3,884,077
[45] May 20, 1975

[54] RATE OF PRESSURE CHANGE SENSING SYSTEM

[75] Inventor: Lawrence F. Athy, Jr., Houston, Tex.

[73] Assignee: Southwestern Manufacturing Co., Houston, Tex.

[22] Filed: June 1, 1973

[21] Appl. No.: 366,098

[52] U.S. Cl. ............................ 73/388 R; 73/40.5 R
[51] Int. Cl. .............................................. G01l 7/00
[58] Field of Search...... 73/40.5 R, 388 R; 137/460, 137/557, 464, 498

[56] References Cited
UNITED STATES PATENTS
3,612,081   10/1971   Williams ............................ 137/460

Primary Examiner—Donald O. Woodiel
Attorney, Agent, or Firm—Pravel & Wilson

[57] ABSTRACT

A new and improved system for sensing an abnormal, large or small change, which may be either an increase or a decrease, in fluid pressure within or after a specified time interval.

9 Claims, 10 Drawing Figures

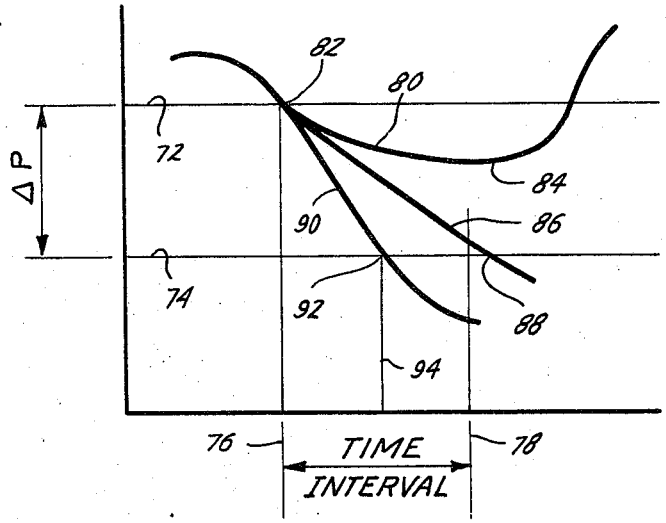
Fig. 1
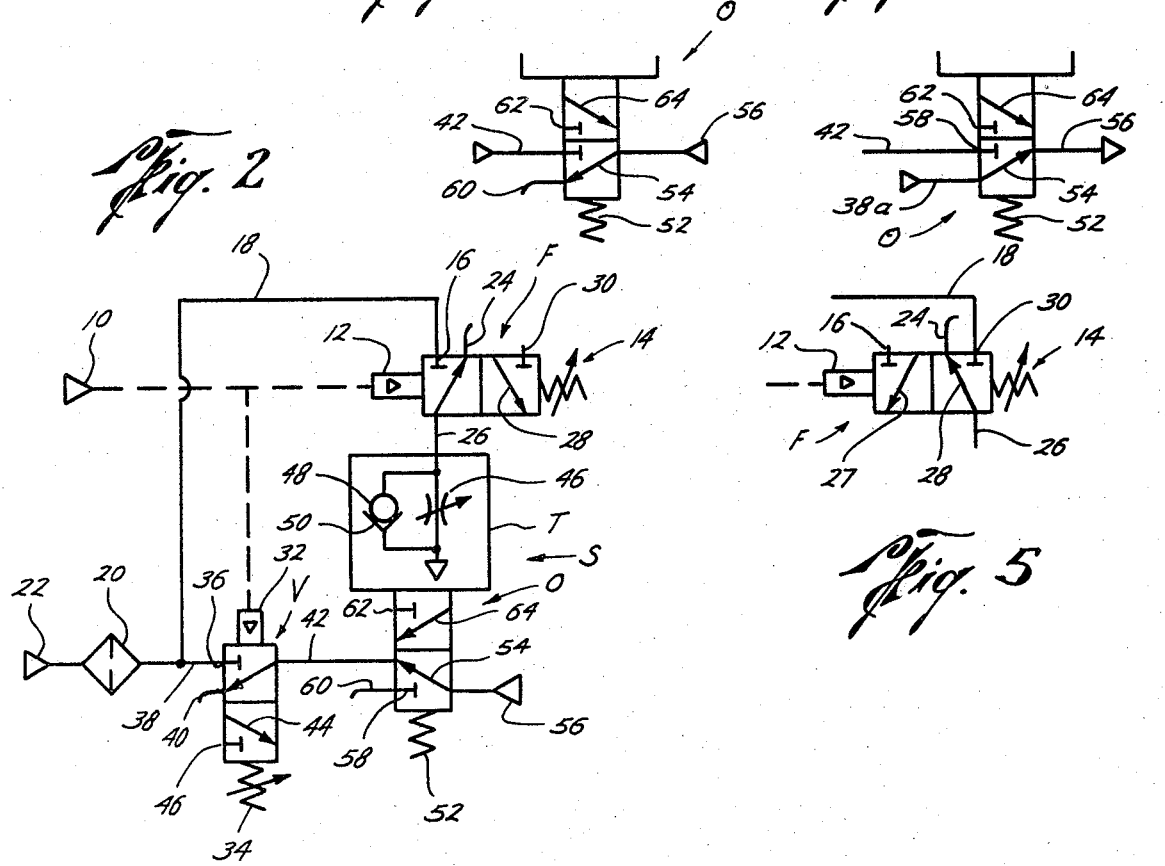
Fig. 9  Fig. 10
Fig. 2  Fig. 5

RATE OF PRESSURE CHANGE SENSING SYSTEM

BACKGROUND OF THE INVENTION

1. Field of the Invention

The present invention relates to systems for sensing rate of change of fluid pressure.

2. Description of the Prior Art

In fluid handling systems, a need has existed for apparatus to sense rapid changes, drops or surges in pressure in the fluid for process control, safety and other purposes.

So far as is known, prior art systems have used two alternative techniques. A first technique compared the fluid pressure against a specific threshold level, while the other technique monitored fluid pressure to detect a specific excessive rate of change in pressure levels, regardless of the time interval involved.

Both techniques had shortcomings. Often during routine operations of a pipe line, chemical processing plant, or refinery, a significant pressure change or a significant pressure transient occurred, although operations were continuing satisfactorily, for example, during routine closing of a process control valve. The prior art systems, set for a particular threshold or a specific rate of pressure change, would often respond to these significant pressure changes due to normal equipment operation and erroneously indicate an abnormal operating condition.

SUMMARY OF THE INVENTION

Briefly, the present invention provides a new and improved system for sensing an abnormal change in pressure in a fluid handling system within a reference time interval.

A first sensor senses a first change in fluid pressure with respect to a first threshold, which changes may be an increase or decrease. A second sensor senses a second change, which may also be an increase or decrease, with respect to a second threshold. A timing means establishes a reference time interval for occurrence of the first change and the second change, and an output means forms an output signal in response to occurrence of these changes within the reference time interval, indicating the abnormal pressure change.

The reference time interval established by the timing means may be a time interval during which both changes must occur, or may be a time interval, beginning on occurrence of the first change, which must have elapsed before the second change occurs in order for an output indication of the abnormal pressure change to be formed.

In one embodiment, the present invention is adapted for sensing a break in a pipe line by sensing a pressure decrease below both a first threshold level and a second threshold level during a predetermined time interval, indicating that a break has occurred in the pipe line.

It is an object of the present invention to provide a new and improved system for sensing an abnormal change in pressure in a fluid handling system.

It is a further object of the present invention to provide a new and improved apparatus for detecting a break in a pipe line.

BRIEF DESCRIPTION OF THE DRAWINGS

FIG. 1 is a schematic diagram of fluid pressure in a fluid handling system as a function of time;

FIGS. 2, 3 and 4 are schematic fluid power diagrams of the system of the present invention;

FIG. 5 is a schematic fluid power diagram of an alternate first sensing valve of the present invention;

FIG. 9 is a schematic fluid power diagram of an output valve connection of the present invention.

FIG. 10 is a schematic fluid power diagram of an alternative output valve connection of the present invention.

DESCRIPTION OF THE PREFERRED EMBODIMENT

Figure 3:
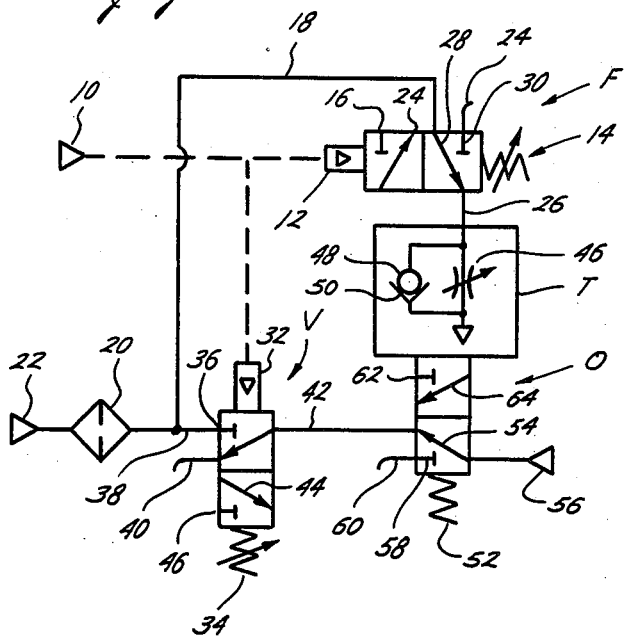

In the drawings, the letter S designates generally the system of the present invention for sensing an abnormal condition in a fluid handling system. The fluid handling system may be, for example, a pipe line carrying liquified gas, natural gas, or other petroleum products; a refinery, or some other suitable conventional fluid handling or conveying system. Since such fluid handling system with which the present invention is used is conventional, details thereof are not shown in the drawings in order to preserve clarity therein. In the accompanying drawings, the various component elements of the system S are set forth in accordance with American National Standard ANS Y 32.10, "Graphic Symbols for Fluid Power Diagrams," and are thus in a form well known and understandable to those of ordinary skill in the art.

The system S of the present invention senses an abnormal condition when a first sensing valve F (FIG. 2) senses a first change with respect to a first pressure threshold in the fluid handling system with which the system S is used, and a second sensing valve V senses a second change with respect to a second threshold in the fluid pressure. The first and second changes sensed by the valves F and V respectively, must occur during a time interval established by a timing valve T for an abnormal condition to be detected. If such an abnormal condition is detected, due to the first and second changes occurring during the interval established by the timing valve T, an output valve O forms an output signal indicating the abnormal pressure change.

As will be set forth below, the first change sensed by the first sensing valve F may be an increase above, or a decrease below, the first threshold of fluid pressure. The second change sensed by the second sensing valve V may also be an increase above, or decrease below, the second pressure threshold, in accordance with the particular abnormal condition to be sensed. Further, the time interval established by the timing valve T may be a time interval during which both pressure changes must occur, or may alternatively be a time interval, beginning on occurrence of the first pressure change, which must have elapsed before the second pressure change occurs in order for an output indication of the abnormal pressure change to be formed. The output valve O may form an output signal indicating by a fluid pressure that the abnormal pressure change has occurred, or conversely indicating by an absence of output fluid pressure that the abnormal pressure change has occurred.

Considering the apparatus A more in detail (FIG. 2), an inlet port 10 conveys the pressure of the fluid in the fluid handling system being monitored by the system S to a sensing port 12 of the first valve F. The fluid pressure at sensing port 12 of the valve F works against a force exerted by a variable force spring 14 of the first valve F. When the pressure exerted by the fluid exceeds the force exerted by the adjustable force spring 14, the first valve F receives a pressurized operating fluid at a blocking port 16 from a pressure supply conduit 18. The pressure supply conduit 18 receives operating fluid pressure through a filter 20 from a pressure supply inlet 22 which is connected to a suitable source of pressurized fluid, such as a container of pressurized gas.

A venting port 24 of the first valve F is in communication with an outlet conduit 26 connecting the first valve F to the timing valve T. The venting port 24 prevents the accumulation of pressure in the timing valve T when the first valve F senses fluid pressure at sensing port 12 exceeding the force exerted by the adjustable force spring 14. The force exerted by the adjustable force spring 14 is established at a first threshold level defined by the particular operating characteristics of the fluid handling system to be monitored.

When the pressure sensed at the sensing port 12 of the first valve F decreases below the first threshold level established by the spring 14, the valve F moves to an alternate operating position (FIG. 3) where a passage or inlet port 28 provides fluid communication from the pressure supply conduit 18 to the outlet conduit 26. In the second or alternate operating position, a blocking port 30 blocks the escape of pressurized fluid from the pressure supply conduit 18 through the venting port 24.

The inlet port 10 additionally conveys the pressure of the fluid in the fluid handling system being monitored by the system S to a sensing port 32 of the second valve V. The fluid pressure at sensing port 32 of the valve V works against a force exerted by a variable force spring 34 of the second valve V. When the pressure exerted by the fluid exceeds the force exerted by the adjustable force spring 34, the second valve V receives a pressurized operating fluid at a blocking port 36 from a pressure supply conduit 38 connected to the filter 20. The pressure supply conduit 38 receives operating fluid pressure through the filter 20 from the pressure supply inlet 22 which is connected, as set forth above, to a suitable source of pressurized fluid, such as a container of pressurized gas.

A venting port 40 of the second valve V is in communication with an outlet conduit 42 connecting the second valve V to the timing valve T. The venting port 40 prevents the accumulation of pressure in the timing valve T when the second valve V senses fluid pressure at sensing port 32 exceeding the force exerted by the adjustable force spring 34. The force exerted by the adjustable force spring 34 is established at a second threshold level defined by the particular operating characterists of the fluid handling system to be monitored.

When the pressure sensed at the sensing port 32 of the second valve V decreases below the second threshold level established by the spring 34, the valve V moves to an alternate operating position (FIG. 4) where a passage or inlet port 44 provides fluid communication from the pressure supply conduit 38 to the outlet conduit 42. In the second or alternate operating position, a blocking port 46 blocks the escape of pressurized fluid from the pressure supply conduit 38 through the venting port 40.

The timing valve T includes a variable flow orifice 46 connected to the conduit 26 to receive pressurized fluid from the power supply conduit 18 through the first valve F when the pressure at the sensing port 12 decreases below the first threshold pressure level set by the spring 14 in the manner set forth above. A check valve 48 and a seat 50 provide a unidirectional flow path opposite that of fluid flow through the orifice 46 for quick releasing action of the output valve O by the timing valve V.

The size of the orifice 46 in the timing valve T is adjusted to establish a time interval during which the changes sensed by the valves F and V must occur. The size of the orifice 46 restricts the flow of fluid from the conduit 26 so that a predetermined time interval elapses before the fluid pressure from the conduit 26 is sufficient to overcome the force exerted on the output valve O by a spring 52.

A passage or flow port 54 in the output valve O provides fluid communication between the conduit 42 and an output port 56. The output port 56 may connect the system S of the present invention to a suitable pressure sensor or indicator which may be, for example, a pressure gauge, a pneumatically operated valve, or a pneumatically driven electrical switch. The output port 56 or pressure sensor may further be connected to an alarm or other signal means, a process control computer, or other suitable control and monitoring apparatus. A block port 58 prevents the escape of fluid through an outlet 60 from the output valve O during the time interval before the timing valve T overcomes the force exerted on the output valve O by the spring 52.

When the time interval established by the variable flow orifice 46 in the timing valve T elapses, the output valve O is moved to a second operating position (not shown) where a blocking port 62 prevents flow of fluid from the conduit 42 to the output port 56, while a return conduit 64 vents fluid from the output port 56 through the outlet 60, thus terminating the output signal.

In the operation of the present invention, the first and second thresholds are set by adjusting the variable forces springs 14 and 34. The system S then monitors fluid pressure present in the fluid handling system being monitored, as indicated at the inlet port 10.

A first threshold level 72 (FIG. 1) indicates a first pressure threshold set by the variable force spring 14 of the first valve F, changes with respect to which are sensed by such valve, while a second threshold 74 indicates a second pressure threshold set by the variable force spring of the second valve V, changes with respect to which are sensed by such valve.

A first time line 76 indicates the beginning of time interval established by the timing valve T. The time interval beginning at the time line 76 begins when the first valve F senses a decrease in the pressure below the first threshold 72, permitting fluid flow from the pressure supply conduit 18 through the conduit 26 to the timing valve T. A second time line 78 indicates termination of the time interval established by the variable flow orifice of the timing valve T, at which time pressure in the timing valve T overcomes the force exerted on the output valve O by the spring 52. In detecting breaks in pipe lines, the abnormal change to be sensed by the system S of the present invention is an excessive rate of pressure drop below the two successive threshold levels 72 and 74. A pressure wave form 80 indicates a significant pressure drop, dropping below the first threshold level 72 at a point 82, so that the first valve S senses a first change in operating pressure in the fluid handling system at the time line 76. The wave form 80 reaches a low level or low point at 84, a significant decrease from the previous pressure. However, since the pressure sensed by the system S never goes below the second threshold level 74 set by the spring 34 in the second valve V, the pressure change is due to normal system operation and thus the second valve V does not operate, and the system S does not erroneously indicate an abnormal operating condition.

A pressure wave form 86 indicates a second type of significant pressure drop commonly encountered in fluid handling systems, dropping below the first threshold level 72 at the point 82 and at time line 76, operating the first valve F in the manner set forth above, and decreasing below the second threshold 74 at a point 88. However, since the time interval between the time lines at 76 and 78 established by the timing valve T has elapsed before the pressure goes below the second threshold 74, the timing valve T has moved to its second operating position, blocking fluid flow at the blocking port 62 and preventing pressurized fluid from the conduit 42 from reaching the output port 56. Thus, a significant change in pressure, decreasing below both pressure thresholds but not during the time limit established by the timing valve T, caused for example by partial system shut-down or other normal operating reasons is not erroneously sensed by the system S of the present invention as an abnormal pressure condition.

A pressure wave form 90 indicates an excessive pressure drop, below the first threshold 72 at the point 82 and below the second threshold 74 at a point 92 and at a time line 94 within the time interval between the time line 76 and 78 established by the timing valve T, an abnormal pressure change caused by abnormal system operating conditions and thus of the kind to be detected and monitored by the system S of the present invention.

When the pressure in the fluid handling system drops below the second threshold level of 74, as indicated at 92 and time line 94, the second valve V moves to a second operating position (FIG. 4) permitting passage of fluid flow from the conduit 38 through the valve V to the conduit 42. Since the time interval established by the timing valve T has yet to elapse, the output valve O is in a flow passing position (FIG. 4) permitting flow of fluid from the conduit 42 to the outlet port 56, forming an output indication of the abnormal pressure change in the fluid handling system which is provided, as set forth above to a suitable pressure sensor, indicator, or other means so the operator of the fluid handling system, or a process control computer or other control equipment, can take suitable corrective or remedial action.

As has been set forth, the system S is adapted for sensing a break in a pipe line by sensing a pressure decrease below both a first threshold level and a second threshold level during a predetermined time interval, indicating that a break has occurred in the pipe line. The system S is also adapted to sense other abnormal pressure changes in fluid handling systems, by adjusting the thresholds of the springs 14 and 34 with the valves F and V, respectively, and the time interval established by the timing valve T. The system can be rearranged so that the output indication formed by the output valve O can also be adjusted so that the absence of fluid pressure at the output port 56 is the output signal indicating the abnormal pressure change.

When the abnormal pressure change to be sensed is of the type including an increase in fluid pressure above the first threshold, the first valve F is connected in an alternate manner. The force exerted by the variable spring 14 again establishes the first threshold level 72, but the blocking port 30 is normally connected to the fluid supply conduit 18. In this manner, until the pressure sensed at the sensing port 12 of the valve F exceeds the force exerted by the spring 14, the valve F prevents the flow of fluid from the conduit 18 to the output conduit 26. When the pressure sensed by the sensing port 12 of the valve F exceeds the force exerted by the spring 14, the valve F moves to an opposite position from that shown (FIG. 5) and a passage port 27 provides fluid communication between the pressure supply conduit 18 and the output conduit 26, permitting the flow of fluid under pressure from the supply 22 to the timing valve T.

When the abnormal pressure change to be sensed is of the type including an increase in fluid pressure above the second threshold, the second valve V is connected in an alternate manner. The force exerted by the variable spring 34 again establishes the second threshold level 74, but the blocking port 46 is normally connected to the fluid supply conduit 38. In this manner, until the pressure sensed at the sensing port 32 of the valve V exceeds the force exerted by the spring 34, the valve V prevents the flow of fluid from the conduit 38 to the output conduit 42. When the pressure sensed by the sensing port 32 of the valve V exceeds the force exerted by the spring 34, the valve V moves to an opposite position from that shown (FIG. 6) and the passage port 40 provides fluid communication between the pressure supply conduit 38 and the output conduit 42, permitting the flow of fluid under pressure from the supply 22 to the output valve O.

When it is desired to indicate an absence of fluid pressure from the output valve O as the output signal, the connections of the second valve V and the output valve O are somewhat different (FIG. 7) from that previously set forth. The output valve O is connected by a supplemental fluid supply conduit 38a at a blocked port 58. The pressure supply conduit 38 in the normal operating position, with pressure at port 32 at a normal level, is connected through the open port 36 of valve V, conduit 42, and the open port of output valve O. An output pressure indication is formed at the output port 56. When the pressure connected at sensing port 32 drops below the second threshold level, the valve V moves to an alternate operating position exhausting the fluid pressure signal from port 56 through passage 54, conduit 42, passage 44 and port 40. When the time interval set by the timing valve T elapses, the output valve O moves to an alternate position (not shown) where the passage port 64 forms a connection between the supplemental fluid supply conduit 38a and the output port 56, while the blocking port 62 blocks the exhaust through conduit 42, passage 44 and port 40, and the signal at output port 56 is restored.

Thus, the connections of the output valve O and the second valve V (FIG. 7) set forth above form an output signal in the nature of an absence of a fluid pressure signal if the abnormal pressure condition being monitored takes place within the time interval established by the timing valve T.

Figure 8:
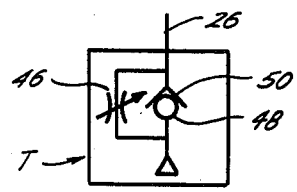
FIG. 8 is a schematic fluid power diagram of an alternate timing valve of the present invention.

When it is desired to permit the timing valve T to vent fluid under pressure to establish the time interval for the system S, the check valve 48 and seat 50 are reversed (FIG. 8) from the connection previously set forth. Pressure is vented through the orifice 46 of the timing valve T at the desired rate by varying the area of the orifice 46 to establish the predetermined time interval of the timing valve T.

The specific interconnection for the first sensing valve F, second sensing valve V, timing valve T and output valve O is thus determined in accordance with several factors.

Figure 4:
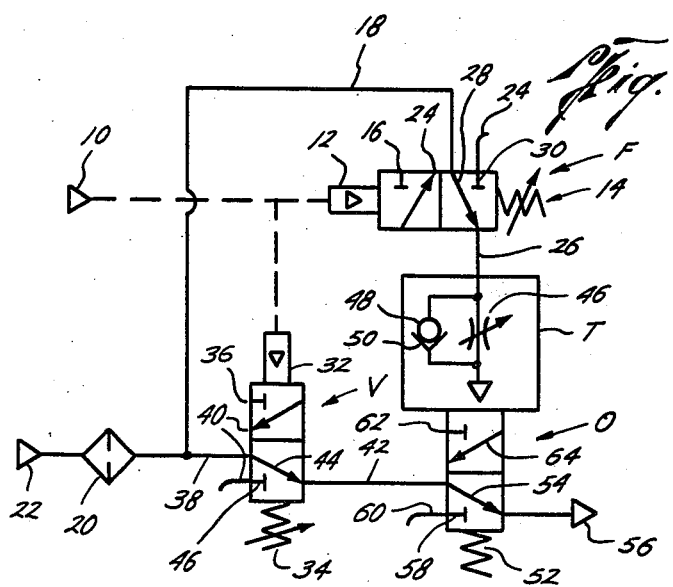

When the type of pressure change to be sensed is a high rate of pressure drop, the system S set forth in FIGS. 2–4 is used. When the abnormal pressure change is a slow rate of pressure drop to be indicated by a fluid pressure presence, the second sensing valve V connection of FIG. 6 and the output valve connection of FIG. 9 is used in the system S of FIGS. 2–4.

Figure 6:
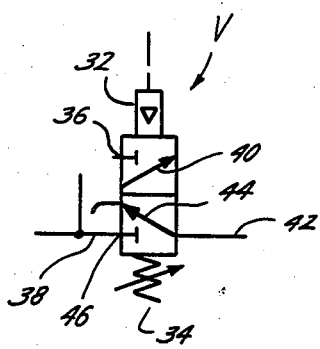
FIG. 6 is a schematic fluid power diagram of an alternate second sensing valve of the present invention.

When the abnormal pressure change to be sensed is a high rate of pressure rise, the valves F and V of FIGS. 2–4 are connected as shown in FIGS. 5 and 6, respectively, in the system S of FIGS. 2–4. When the abnormal change is a slow rate of pressure rise to be indicated by a fluid pressure presence at the output port 56, the first sensing valve F connection of FIG. 5 and the output valve connection of FIG. 9 is used in the system S of FIGS. 2–4.

Figure 7:
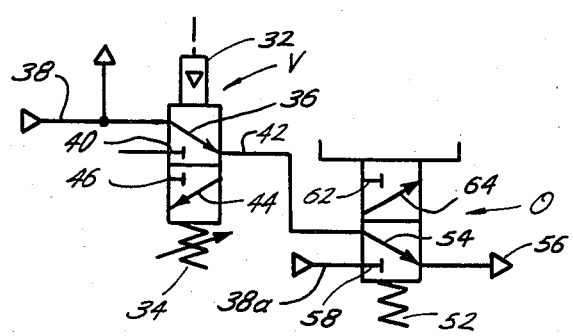
FIG. 7 is a schematic fluid power diagram of an alternate connection of the second sensing system valve and the output valve of the present invention.

When the absence of an output fluid pressure presence is desired to indicate the abnormal high rate of pressure rises or drops of the type set forth above, the connection of the sensing valve V is opposite to that previously set forth and the output valve O connection of either FIG. 7 or FIG. 10 is used. When an absence of fluid pressure is to indicate a high rate of pressure drop, the connection of sensing valve V in FIGS. 2–4 is adjusted to that of FIG. 6 and of output valve O is adjusted to that of FIG. 7.

The foregoing disclosure and description of the invention are illustrative and explanatory thereof, and various changes in the size, shape, and materials as well as in the details of the illustrated construction may be made without departing from the spirit of the invention.

I claim:

1. A system for sensing an abnormal change in pressure in a fluid handling system within a reference time interval, comprising:
   a. means for establishing a first fixed pressure threshold level;
   b. first sensor means for sensing a first change in the fluid pressure in the system with respect to the first fixed pressure threshold level;
   c. means for establishing a second fluid pressure threshold level;
   d. second sensor means for sensing a second change in the fluid pressure in the system with respect to the second fixed pressure threshold level;
   e. timing means for establishing a reference time interval for occurrence of an abnormal pressure change in the form of said first change and said second change; and
   f. output means for forming an output signal in response to occurrence of said first change and said second change within the reference time interval established by said timing means to thereby indicate the abnormal pressure change.

2. The structure of claim 1, wherein said output means comprises:
   output means for forming a fluid pressure signal whose presence forms the output signal.

3. The structure of claim 1, wherein said output means comprises:
   output means for removing a fluid pressure whose absence indicates the output signal.

4. The structure of claim 1, wherein said first sensor means comprises:
   first sensor means for sensing an increase in fluid pressure above the first pressure threshold level.

5. The structure of claim 1, wherein said first sensor means comprises:
   first sensor means for sensing a decrease in fluid pressure below the first pressure threshold level.

6. The structure of claim 1, wherein said second sensor means comprises:
   second sensor means for sensing an increase in fluid pressure above the second pressure threshold level.

7. The structure of claim 1, wherein said second sensor means comprises:
   second sensor means for sensing a decrease in fluid pressure below the second pressure threshold level.

8. The structure of claim 1, wherein said timing means comprises:
   timing means for establishing a reference time interval during which said first change and said second change must occur in order to activate said output means.

9. The structure of claim 1, wherein said timing means comprises:
   a. timing means for establishing a reference time interval beginning when said first sensor means senses said first change and lasting a predetermined time interval thereafter; and
   b. said timing means further comprising means forming a time interval beginning on occurrence of said first change, which must elapse before said second change occurs in order for an output indication of the abnormal pressure change to be formed.

* * * * *